US009240893B2

(12) United States Patent
Zwiebel et al.

(10) Patent No.: US 9,240,893 B2
(45) Date of Patent: *Jan. 19, 2016

(54) BIDIRECTIONAL MULTICAST PROTOCOL WITH UPSTREAM AND DOWNSTREAM JOIN MESSAGES

(75) Inventors: John M. Zwiebel, Santa Cruz, CA (US); Dino Farinacci, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 12/897,420

(22) Filed: Oct. 4, 2010

(65) Prior Publication Data

US 2011/0211578 A1    Sep. 1, 2011

Related U.S. Application Data

(63) Continuation of application No. 11/258,641, filed on Oct. 26, 2005, now Pat. No. 7,808,993.

(51) Int. Cl.
*H04L 12/18* (2006.01)
*H04L 12/761* (2013.01)

(52) U.S. Cl.
CPC ............. *H04L 12/185* (2013.01); *H04L 45/16* (2013.01)

(58) Field of Classification Search
None
See application file for complete search history.

(56) References Cited

U.S. PATENT DOCUMENTS

| 5,519,704 | A | 5/1996 | Farinacci et al. | 370/85.13 |
| 6,088,333 | A | 7/2000 | Yang et al. | 370/238 |
| 6,182,147 | B1 | 1/2001 | Farinacci | 709/238 |
| 6,301,223 | B1 | 10/2001 | Hrastar et al. | 370/227 |
| 6,389,453 | B1 | 5/2002 | Willis | 709/204 |
| 6,526,054 | B1 * | 2/2003 | Li et al. | 370/390 |
| 6,707,796 | B1 | 3/2004 | Li | 370/254 |
| 6,845,091 | B2 | 1/2005 | Ogier et al. | 370/338 |
| 6,871,235 | B1 | 3/2005 | Cain | 709/239 |
| 6,917,983 | B1 | 7/2005 | Li | 9/238 |
| 6,917,985 | B2 | 7/2005 | Madruga et al. | 709/238 |
| 7,099,323 | B1 | 8/2006 | Doong et al. | 370/390 |
| 7,221,660 | B1 * | 5/2007 | Simonson et al. | 370/312 |

(Continued)

OTHER PUBLICATIONS

E. Duros, et al., Network Working Group Request for Comments 3077, "A Link-Layer Tunneling Mechanism for Unidirectional Links," Mar. 2001, pp. 1-24, ftp://ftp.ietf.org/rfc/rfc3077.txt.

(Continued)

*Primary Examiner* — Gregory Sefcheck
*Assistant Examiner* — Daniel Mitchell
(74) *Attorney, Agent, or Firm* — Campbell Stephenson LLP

(57) ABSTRACT

Systems and methods for implementing a bidirectional multicast protocol with two types of join messages are disclosed. The two types of join messages, upstream joins and downstream joins, are used to control the Reverse Path Forwarding (RPF) interface is added to the outgoing interface list for a particular multicast group, which in turn controls when multicast packets will be forwarded to the rendezvous point. One method involves receiving a multicast packet addressed to multicast group G. The method inhibits the multicast packet from being forwarded via the RPF interface, unless the outgoing interface list corresponding to the multicast group G already identifies the RPF interface. The RPF interface can be added to the outgoing interface list in response to reception of a downstream join message via the RPF interface, as well as in response to monitoring, via the RPF interface, an upstream join message on a shared network segment.

19 Claims, 7 Drawing Sheets

(56) References Cited

U.S. PATENT DOCUMENTS

| | | | | |
|---|---|---|---|---|
| 7,225,243 | B1 | 5/2007 | Wilson | 709/223 |
| 7,385,977 | B2 | 6/2008 | Wu et al. | 370/389 |
| 7,420,972 | B1 | 9/2008 | Woo et al. | 370/390 |
| 7,453,807 | B2 * | 11/2008 | Sanchez et al. | 370/235 |
| 7,508,827 | B2 | 3/2009 | Kawamura | 370/390 |
| 2001/0025377 | A1 | 9/2001 | Hinderks | 725/109 |
| 2001/0040895 | A1 | 11/2001 | Templin | 370/466 |
| 2002/0085506 | A1 | 7/2002 | Hundscheidt et al. | 370/254 |
| 2003/0165140 | A1 | 9/2003 | Tang et al. | 370/393 |
| 2004/0125803 | A1 * | 7/2004 | Sangroniz et al. | 370/390 |
| 2004/0205215 | A1 | 10/2004 | Kouvelas et al. | 709/231 |
| 2005/0213525 | A1 | 9/2005 | Grayson et al. | 370/312 |
| 2006/0146857 | A1 | 7/2006 | Naik et al. | 370/432 |
| 2006/0209826 | A1 * | 9/2006 | Kawamura | 370/390 |
| 2006/0221866 | A1 | 10/2006 | Shepherd | 370/255 |
| 2006/0262792 | A1 | 11/2006 | Rokui | 370/390 |
| 2007/0091828 | A1 * | 4/2007 | Ashwood-Smith | 370/256 |

OTHER PUBLICATIONS

D. Estrin, et al., Network Working Group Request for Comments 2362, "Protocol Independent Multicast-Sparse Mode (PIM-SM): Protocol Specification," Jun. 1998, pp. 1-62, ftp://ftp,isi.edu/in-notes/rfc2362.txt.

Cisco Systems, Inc., "Unidirectional Link Routing for Unicast and Multicast Environments," Jan. 16, 2003, pp. 1-18, www.cisco.com/univered/cd/td/doc/product/software/ios120/120newfl/120t/120t3/igmpudlr.htm.

Topology Dissemination Based on Reverse Path Forwarding (TBRPF), RFC 3684, SRI International, Feb. 2004, pp. 19-20.

Boers, A., et al., *Format for Using PIM Proxies*, Internet Engineering Task Force (IETF), Feb. 2006, pp. 1-7, http://www3.ietf.org/proceedings/05mar/IDs/draft-ietf-pim-proxy-00.txt.

Boers, A., et al., *Format for Using TLVs in PIM Messages*, Internet Engineering Task Force (IETF), Oct. 2005, pp. 1-8, http://tools.ietf.org/wg/pim/drafl-ietf-pim-join-attributes/draft-ietf-pim-join-attributes-00.txt.

Bonaventure, Olivier, et al., *Towards Multicast Fast Reroute*, Computing Science and Engineering Department, UCL, Nov. 21, 2005, pp. 1-75.

Xu, Xiaohu, "Multicast in BGP/MPLS VPN," L3VPN Working Group, Huawei Technologies Co., Ltd., Oct. 17, 2005, http://www.watersprings.org/pub/id/draft-xu-13vpn-2547bix-mcast-01.txt, pp. 1-11.

Xu, Xiaohu, E-mail entitled "RPF Checking for Fast Convergence of MVPN," Feb. 20, 2006 http://www.ietf.org./mail-archive/web/13vpn/current/msg01434.html, pp. 1, 2.

Aiguo Fei, et al., "A 'Dual Tree' Scheme for Fault-Tolerant Multicast," Proceedings of ICC, 2001, Helsinki (Finland), Jun. 11-14, 2001, XP010553091 © 2001, IEEE, pp. 690-694.

B. Cain et al., Network Working Group—Request for Comments: 3376, "Internet Group Management Protocol, Version 3," Oct. 2002, pp. 1-50.

* cited by examiner

BIDIRECTIONAL MULTICAST PROTOCOL WITH UPSTREAM AND DOWNSTREAM JOIN MESSAGES

CROSS-REFERENCE TO RELATED APPLICATIONS

The present patent application is a continuation of U.S. patent application Ser. No. 11/258,641, filed on Oct. 26, 2005, now U.S. Pat. No. 7,808,993 entitled "BIDIRECTIONAL MULTICAST PROTOCOL WITH UPSTREAM AND DOWNSTREAM JOIN MESSAGES" and is incorporated by reference herein in its entirety and for all purpose as if completely and fully set forth herein.

FIELD OF THE INVENTION

This invention relates to the field of networking and, more particularly, to multicast routing.

DESCRIPTION OF THE RELATED ART

Protocol Independent Multicast (PIM) Bidirectional (Bidir) is a multicast protocol that is used to convey packets from a source to multiple destinations. PIM-Bidir shares a common control message format with other PIM protocols such as PIM-SM (Sparse Mode), PIM-DM (Dense Mode), and PIM-SSM (Source Specific Mode).

Generally, PIM-Bidir is similar to PIM-SM. In particular, both protocols operate similarly when creating shared-tree (as represented by (*,G)) state. Differences between PIM-Bidir and PIM-SM include the fact that in PIM-Bidir, multicast packets are sent to the Rendezvous Point (RP) upstream along a shared tree, which is bidirectional. In PIM-SM, multicast packets are unicast to the RP in encapsulated Register messages, which are then de-encapsulated and multicast to the interested receivers by the RP. Unlike PIM-SM and PIM-SSM, PIM-Bidir does not support source-based trees (as represented by (S,G) state), and thus only shared trees (as represented by (*,G) state) are implemented. Another new feature of PIM-Bidir is that one router on each network link (e.g., one router per LAN) is selected as the Designated Forwarder (DF). All other network devices on that link send PIM-Bidir control messages or forward multicast packets to the DF, which in turn forwards that traffic toward the RP. Proper use of DFs can eliminate forwarding loops.

Another difference between PIM-Bidir and PIM-SM is that in PIM-Bidir, the control plane operates independently of the data plane. In other words, control actions (such as sending PIM messages or updating multicast forwarding state information) are not taken in response to data traffic, or the lack thereof. Separating the control and data planes allows PIM-Bidir to be very scalable, especially when there are multiple sources for each group. However, one drawback that arises is that, in conventional implementations of PIM-Bidir, the control plane is unable to distinguish between groups that currently have receivers and groups that do not currently have any receivers. As a result, multicast data traffic for a particular group may be needlessly forwarded toward the rendezvous point when there are no actual receivers subscribed to that group. This wastes network bandwidth and may ultimately reduce network performance. Accordingly, improved techniques for implementing PIM-Bidir are desired.

BRIEF DESCRIPTION OF THE DRAWINGS

A more complete understanding of the present invention may be acquired by referring to the following description and the accompanying drawings, in which like reference numbers indicate like features.

Figure 1:
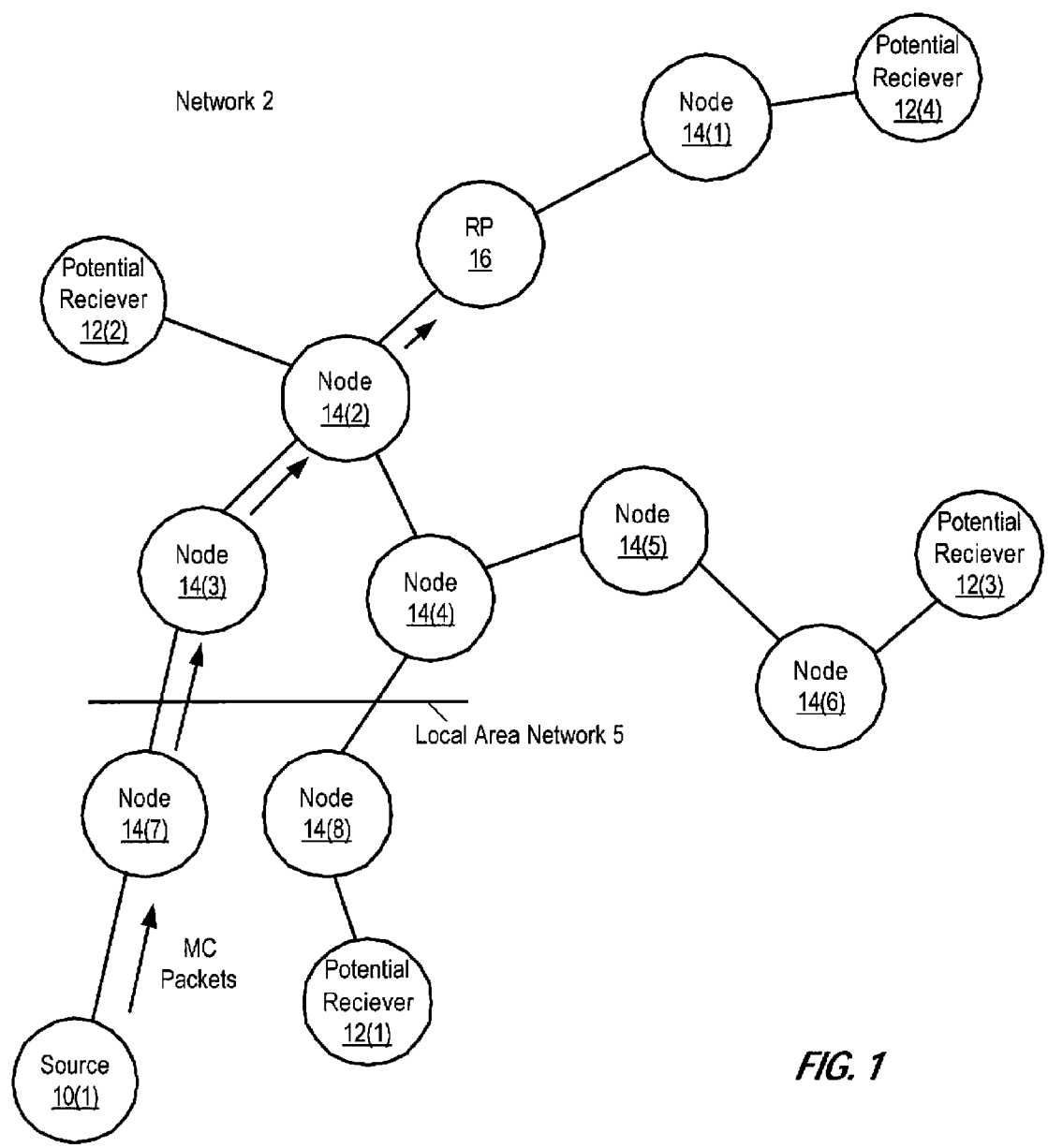
FIG. 1 is a block diagram of a network that implements a conventional version of PIM-Bidir that lacks downstream joins.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A network that uses a bidirectional multicast routing protocol, such as PIM-Bidir, to propagate multicast messages can implement two types of join messages: upstream join messages and downstream join messages. An upstream join is sent in the upstream direction from receivers toward the rendezvous point. In contrast, downstream joins are sent in the opposite direction. In response to receiving either type of join message, a node creates a (*,G) multicast forwarding state for the multicast group G specified in the join message, if the forwarding state does not already exist. If the forwarding state for group G already exists, the node will update the forwarding state. If the join message is an upstream join, the new (*,G) multicast forwarding state will include the receiving interface, but not the reverse path forwarding (RPF) interface (the interface that is used to send messages to the rendezvous point), in the outgoing interface (OIF) list. Additionally, in some embodiments, if a node coupled to a shared network segment detects an upstream join for group G that is being sent to the designated forwarder (DF) for that shared network segment, the node adds the RPF interface to the OIF list of the (*,G) state (or adds a (*,G) state having such an OIF list if no (*,G) state already exists). In contrast, if the join message is a downstream join message, the OIF list in the new forwarding state will identify the receiving interface (which is typically the RPF interface).

Propagation of downstream join messages is controlled so that the RPF interface is not included in the OIF list maintained by nodes that do not need to forward multicast traffic towards the rendezvous point. Since the OIF lists maintained by these nodes will not identify the RPF interface, these nodes will not forward multicast packets addressed to group G toward the rendezvous point. Accordingly, the amount of bandwidth that is unnecessarily consumed by multicast traffic can be reduced.

Conventional PIM-Bidir with a Single Type of Join Message

FIG. 1 is a block diagram of a network 2. In this example, network 2 implements a conventional version of PIM-Bidir, which lacks downstream joins. As shown, network 2 includes a multicast source 10(1), several potential multicast receivers 12(1)-12(4), network nodes 14(1)-14(8), and a rendezvous point (RP) 16. The version of network 2 shown in FIG. 1, which implements a single type of PIM-Bidir join message, is provided as a contrast to the version of network 2 shown in FIG. 2, which implements an embodiment of the present invention in order to support two types of PIM-Bidir join messages.

As shown in FIG. 1, multicast source 10(1) is coupled to node 14(7). A multicast source is a device that sends packets to a multicast group G. Potential receiver 12(1) is coupled to node 14(8), potential receiver 12(2) is coupled to node 14(2), potential receiver 12(3) is coupled to node 14(6), and potential receiver 12(4) is coupled to node 14(1). Potential receivers are receivers that are capable of subscribing to the multicast group G, but have not yet subscribed.

Node 14(1) and 14(2) are coupled to RP 16. Nodes 14(3) and 14(4) are coupled downstream (relative to the RP) to node 14(2), and node 14(7) is coupled downstream to node 14(3). Node 14(8) is coupled downstream to node 14(4). Nodes 14(3), 14(4), 14(7), and 18(8) are coupled by a local area network (LAN) 5, and node 14(3) has been selected as the designated forwarder (DF) for LAN 5. Node 14(5) is coupled downstream to node 14(4), and node 14(6) is coupled downstream to node 14(5). Each node is a network device that includes routing functionality. RP 16 is a node that has been selected to act as the rendezvous point for multicast group G in the PIM-Bidir protocol.

The identity of the rendezvous point is provided to each node within network 2 (e.g., by statically configuring the RPF interface on each node or by using automatic-RP or bootstrap router (BSR) techniques). As a result, each node stores information identifying its reverse path forwarding (RPF) interface, which is the interface leading toward the RP (i.e., the interface used to send packets to the RP on the shortest available path). Whenever a potential receiver subscribes to a multicast group G (e.g., by sending an Internet Group Management Protocol (IGMP) host report), the node that couples that potential receiver to network 2 generates a PIM join message.

As mentioned above, the version of network 2 shown in FIG. 1 only implements one type of join message in PIM-Bidir. Join messages are multicast to all nodes, including the RP (e.g., PIM join messages are sent to a multicast destination address, such as 224.0.0.13). Receipt of a join message specifying multicast group G causes a node to update its (*,G) state (or to create such a state, if one does not already exist). In response to receiving a join message via a particular interface, the node will add the receiving interface to the outgoing interface (OIF) list maintained as part of the (*,G) state. The RPF interface is also automatically included in the OIF list. It is noted that within a LAN, all nodes on the LAN will detect all join messages conveyed via the LAN; however, the PIM protocol specifies which of those nodes is actually suppose to process the join message.

Before any receivers subscribe to multicast group G, multicast packets sent by multicast source 10(1) are forwarded to RP 16, as shown by the arrows in FIG. 1. In other words, if multicast packets addressed to a multicast group are received by a node, and if that node lacks forwarding state information for that multicast group, the node will forward the multicast packets towards the rendezvous point. Since there are no receivers interested in receiving the packets, bandwidth is wasted transmitting multicast packets from multicast source 10(1) to RP 16 in this situation.

When potential receiver 12(1) joins multicast group G, node 14(8) sends a PIM-Bidir join message towards the rendezvous point. This join message is propagated hop-by-hop towards the RP. The join message is then propagated back down to the other nodes from the RP. After the join message has been propagated throughout the network, each node 14(1)-14(8) will have created a (*,G) state for multicast group G, which will include the receiving interface and/or the RPF interface, which is automatically included in the OIF list when the (*,G) forwarding state is created, in the OIF list. This (*,G) forwarding state forwards all packets addressed to G to the RP; the RP will then forward the packets downstream towards the receiver. Thus, in versions of PIM-Bidir that implement a single type of join message, multicast packets are always forwarded upstream to the RP. Once a receiver subscribes to the group, (*,G) forwarding state is created so that multicast packets will be forwarded downstream to the receiver.

In this example, as a result of the (*,G) state created in response to the join message, multicast packets addressed to multicast group G will be forwarded to sections of the network that do not have any current receivers. In the example where potential receiver 12(1) is the only receiver that has actually subscribed to multicast group G, packets addressed to multicast group G are forwarded from source 10(1) to node 14(7). Node 14(7) forwards the multicast packets to node 14(8), which then provides the multicast packets to receiver 12(1), and also to node 14(3). Node 14(3) then forwards the packets to node 14(2), which in turn forwards the packets to RP 16. The transmission of the multicast packets from node 14(7) to RP 16 wastes bandwidth.

Figure 2:
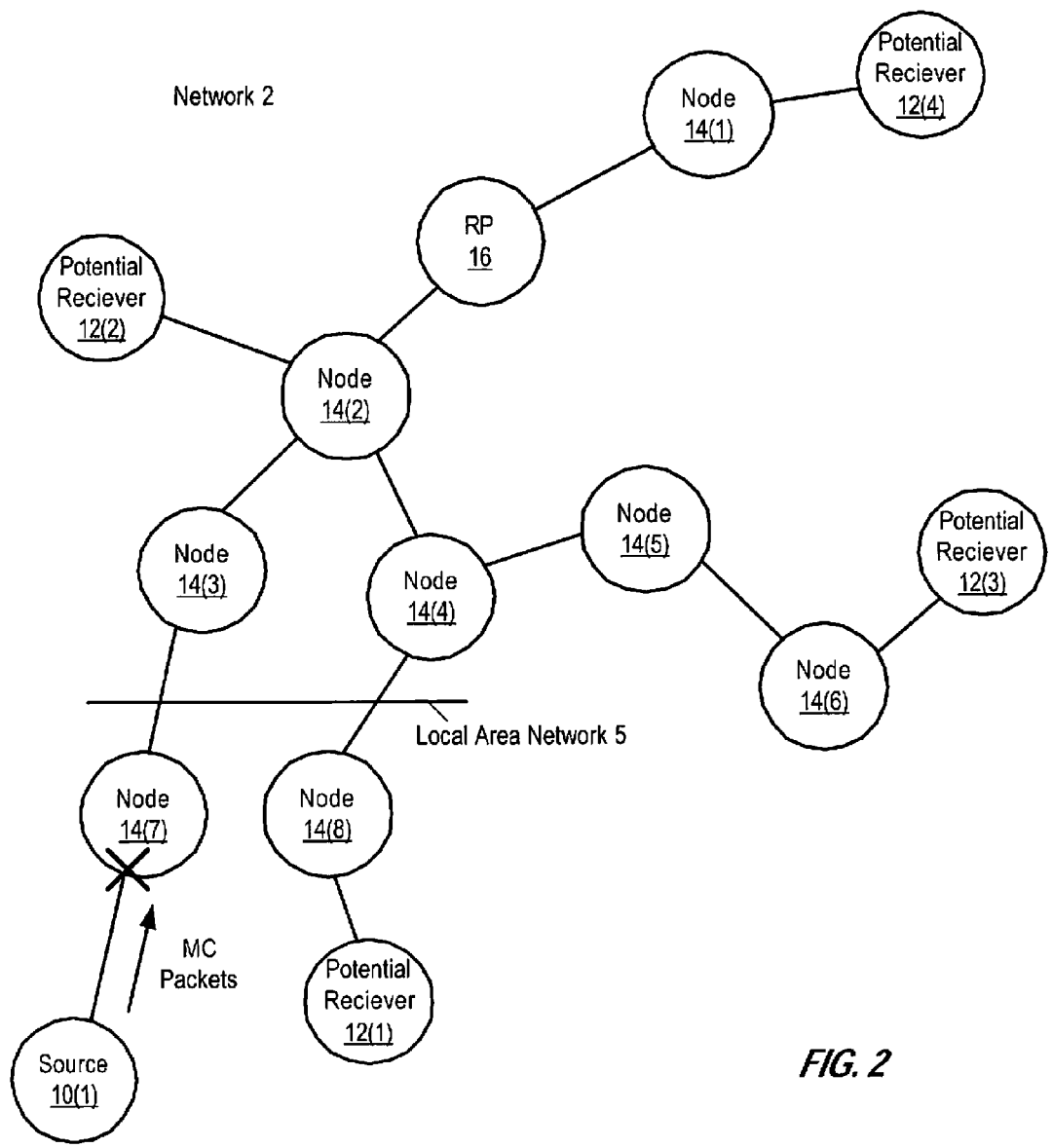
FIGS. 2, 3, and 4 are block diagrams of a network that implements PIM-Bidir with downstream joins, according to one embodiment of the present invention.
Figure 3:
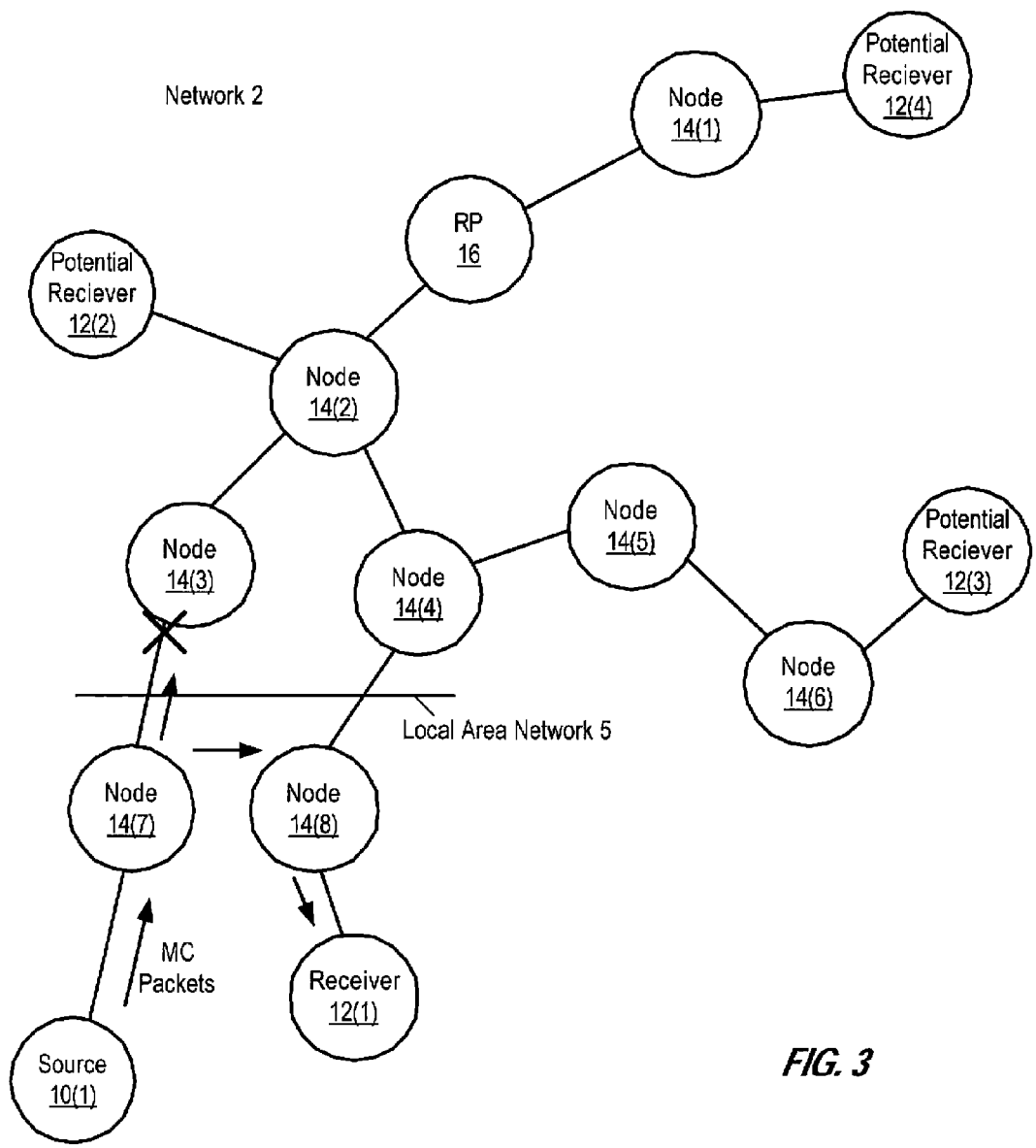
Figure 4:
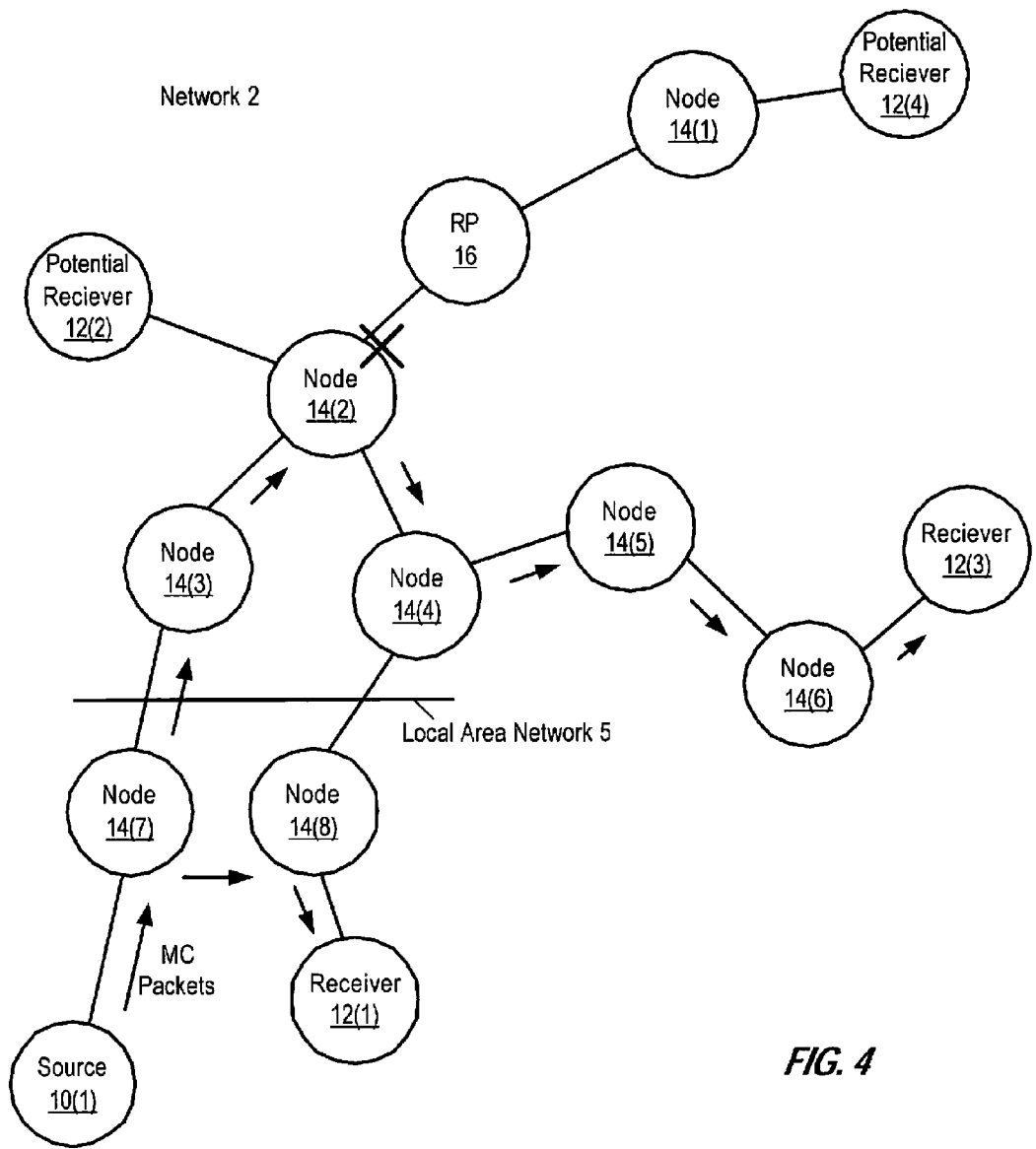

As the example above illustrates, there are scenarios in which bandwidth may be wasted when network 2 is implemented with a PIM-Bidir that only includes one type of join message. FIGS. 2, 3, and 4 illustrate an alternative, in which PIM-Bidir is implemented with two types of join messages.

PIM-Bidir Using Upstream and Downstream Join Messages

FIGS. 2, 3, and 4 are block diagrams of a version of network 2 that implements PIM-Bidir with two types of join messages: upstream joins and downstream joins. Similarly, there are two types of prune messages: upstream prunes and downstream prunes. It is noted that in at least some embodiments, join and prune messages are implemented as Join-Prune (JP) messages, which is a type of PIM message that can include either join information or prune information. Information included in a JP message indicates whether that particular message includes join information or prune information. To avoid confusion, messages are referred to herein as being either join messages or prunes message; however, it is noted that such join and prune messages can be implemented as JP messages. In such implementations, there will be two types of JP messages: upstream JP messages and downstream JP messages. Additionally, in some embodiments, upstream joins (and prunes) are implemented as conventional PIM join (and prune) messages. In such embodiments, a new PIM message type is defined for downstream joins (and prunes).

Similar to FIG. 1, the version of network 2 shown in FIG. 2 includes a multicast source 10(1), several potential multicast receivers 12(1)-12(4), network nodes 14(1)-14(8), and a RP 16. While RP 16 is illustrated as an actual node (e.g., a network device such as a router) in this example, it is noted that in other embodiments, the rendezvous point may be virtual. In other words, in some embodiments, a rendezvous point can be designated at a particular point in the network, even if there is no actual network device at that point in the network. For example, the RP can be an IP address that is assigned to a network segment but is not assigned to any particular node on that network segment. Other nodes will still be able to identify interfaces leading towards the RP; however, there will not be an actual device that is elected as the RP.

Network 2 interconnects one or more multicast sources, such as multicast source 10(1), to one or more potential receivers 12(1)-12(4). Network 2 can include one or more local area networks (LANs), such as LAN 5, and/or wide area networks (WANs). Network 2 can be implemented using any (or a combination) of a variety of different media, including wireless links, coaxial cables, fiber optic cables, and the like. It is noted that one device (e.g., a node, receiver, or source) can be coupled to another device either directly by a physical link (as shown in FIG. 2) or indirectly by, for example, a logical tunnel or several physical links and intervening network devices.

Multicast source 10(1) is configured to send a data stream to the multicast group address G. Multicast source 10(1) is a computing device (e.g., a host computer system, personal digital assistant, cell phone, network appliance, network device, and the like) that encodes a data stream for transmission via network 2 and then sends multicast packets containing the encoded data stream to receivers via network 2. For example, multicast source 10(1) can be a video head end that receives a video stream, prepares that video stream for transmission, and sends packets that encode the video stream to receivers via network 2. As another example, multicast source 10(1) can prepare and transmit stock market information to receivers via network 2, and the receivers can use the information to generate stock market quotes.

Multicast receivers 12(1)-12(4) are computing devices that subscribe to a multicast group G (e.g., by sending a PIM join message or by sending an Internet Group Management Protocol (IGMP) group report to a node, which causes the node to generate a multicast group join). Multicast receivers 12(1)-12(4) are potential receivers until they subscribe to a multicast group. After subscribing, multicast receivers are actual receivers. Multicast receivers 12(1)-12(4) then receive a data stream addressed to multicast group G via network 2, decode the data stream, and present the decoded data stream to users (e.g., via a display device such as a monitor and/or an audio device such as a speaker). Multicast receivers 12(1)-12(4) can be personal computers, personal digital assistants, cell phones, network appliances, set top boxes, and the like.

Nodes 14(1)-14(8) (collectively, nodes 14) include various network devices that perform routing functions and support a routing protocol. Each node 14(1)-14(8) maintains a routing table that stores routing information identifying routes to various data sources. Nodes 14(1)-14(8) use one or more routing protocols to share information in their routing tables with each other by routinely (i.e., in a routine manner, such as at periodic intervals or in response to predesignated stimuli) sending routing advertisements to each other. Nodes 14 refresh multicast routing information by routinely sending join messages to each other.

In the example of FIG. 2, nodes 14(1)-14(8) are configured to implement a version of PIM-Bidir that features two different types of join messages: upstream join messages and downstream join messages. As used herein, "upstream" and "downstream" describe directions within a network, relative to the RP. For example, if a node sends a message via the RPF interface, the node is sending the message upstream. If a node sends a message via a non-RPF interface, the node is sending the message downstream. It is possible to have multiple RPs within the same network (e.g., RP1 can be the RP for multicast group G1, RP2 can be the RP for multicast group G2, and so on). Accordingly, "upstream" and "downstream" are defined relative to the relevant RP (e.g., assuming that a node has different RPF interfaces for RP1 and RP2, a message that is sent from that node towards RP1 can be described as being sent upstream if the message specifies G1 and downstream if the message specifies G2). Upstream and downstream join messages are different types of join messages; when used to describe join messages, "upstream" and "downstream" describe the direction in which a type of join message is typically (although not necessarily always) sent. Thus, upstream join messages are typically sent upstream, while downstream join messages are typically sent downstream.

Upstream join messages are generated and sent in response to receiving a request to subscribe to a multicast group from a receiver, or in response to receiving an upstream join message from another node. Upstream join messages are sent via the RPF interface, towards the RP.

In response to receiving an upstream join specifying multicast group G, the receiving node creates or modifies the (*,G) forwarding state information for multicast group G to include the receiving interface (i.e., the interface of the receiving node via which the upstream join message was received) in the OIF list. However, unlike in conventional versions of PIM-Bidir, the node will not automatically add the RPF interface to the OIF list in response to receiving an upstream join message.

A node will generate and send downstream join message(s) for multicast group G if the (*,G) forwarding state is created and/or modified to include the RPF interface in the OIF list. Downstream join messages for multicast group G are also generated and sent upon receipt of any PIM join (upstream or downstream) that results in more than two interfaces in the OIF list of the (*,G) forwarding state. Additionally, the node can generate and send a downstream join message specifying multicast group G in response to receiving an upstream join that creates (*,G) state; however, the node only sends the downstream join message from interfaces other than the interface that received the upstream join. Each node can periodically resend downstream join messages in order to refresh the forwarding state information maintained by downstream nodes. In one embodiment, downstream joins (as well as corresponding downstream prunes, described in more detail below) use the existing PIM join/prune format but place a unique multicast address, e.g., 224.0.0.13, into the upstream neighbor address field.

Downstream joins are sent only via interfaces for which the router has been elected as the designated forwarder (DF). If a downstream join message is generated in response to receipt of another join message (either upstream or downstream), the downstream join message is not sent via the interface that received the first join message. Downstream messages flow downstream, away from the RP, to instantiate forwarding state that will direct upstream packet flow. This differs from traditional single-type join messages, which flow upstream in order to instantiate forwarding state to control downstream packet flow.

In response to receiving a downstream join that specifies multicast group G, a node will create (if not already instantiated) (*,G) multicast forwarding state information. The (*,G) multicast forwarding state will identify the receiving interface, which is typically the RPF interface. In some embodiments, downstream joins are only properly received via the RPF interface. In such embodiments, downstream join messages that are received via interfaces other than the RPF interface are dropped and do not affect forwarding state maintained by the receiving device.

Receipt of either an upstream join or a downstream join for multicast group G will result in the creation of (*,G) multicast forwarding state information for G, if such forwarding information has not already been created. Additionally, if not already included in the OIF list, the receiving interface (the interface that received the upstream or downstream join) will be added to the OIF list of the (*,G) multicast forwarding state. The major difference between the two types of joins is that, if the join is a downstream join, the RPF interface will be added to the OIF list. If instead the join is an upstream join, the RPF interface will typically not be added to the OIF list. One exception arises if the RPF interface of the node monitors the upstream join on a shared network segment and the upstream join is being sent to the designated forwarder for that network segment. In that situation, the RPF will be added to the OIF list.

The RPF interface must be explicitly added to the OIF-list in the (*,G) forwarding state information before packets can be forwarded upstream to the RP. Thus, a node will not forward multicast packets addressed to destination address G upstream (towards the RP) unless that node has already instantiated (*,G) state information that includes the RPF interface in the OIF list. Thus, even if a node has been elected as the designated forwarder, that node will not automatically forward the multicast packets upstream unless the RPF interface has been added to the OIF list. Similarly, a node that has not instantiated any (*,G) forwarding state information will not automatically forward multicast packets to the RP.

In some embodiments, nodes 14 can implement both a conventional version of PIM-Bidir, which uses a single type of join message, and the version of PIM-Bidir that uses upstream and downstream join messages. Each node can send a PIM hello message to a neighboring node, and the PIM hello message can include information (e.g., a bit that is set to indicate compatibility with multiple types of join messages) identifying that the sending node is capable of supporting two types of join messages. In response to receiving that PIM hello message, the neighboring node can determine that it is safe to use the version of PIM-Bidir that supports both upstream and downstream join messages. If a node sends a Hello message that indicates (e.g., through the lack of a particular option) that the sending node does not support multiple types of join messages, the neighboring node can determine that it should use the version of PIM-Bidir that only uses a single type of join message.

In addition to supporting two different types of join messages, the version of network 2 shown in FIGS. 2, 3, and 4 can also support two types of prune messages: upstream prunes and downstream prunes. Prune messages are generated and sent in response to receivers unsubscribing from a particular multicast group. A node can generate and send a prune message in response to an IGMP host report from a receiver, indicating that the receiver is unsubscribing to multicast group G. A node can also generate and send a prune message in response to receiving a prune message from another node. Upstream prunes are propagated towards the RP, either in response to receiving an upstream prune or in response to receiving an IGMP host report. Non-RPF interfaces are removed from the OIF list upon receipt of upstream prunes (e.g., the interface that received the upstream prune will be removed from the OIF list).

A node will generate and send a downstream prune message for multicast group G in several situations. One such situation occurs whenever the OIF-list in the (*,G) forwarding state is updated to only include a single OIF, and that single OIF is not the RPF interface. In this situation, the node sends a downstream prune message for multicast group G from the single interface identified in the OIF list of the (*,G) forwarding state. Another situation occurs when the OIF list in the (*,G) forwarding state is modified to not include any OIFs (i.e., when the OIF list is NULL). In this scenario, the node sends a downstream prune message to all downstream nodes for which that node has been elected the designated forwarder. The RPF interface can be removed from the OIF list upon receipt of a downstream prune.

Each node can include information in the (*,G) forwarding state that indicates whether an upstream join has been detected for multicast group G. For example, in one embodiment, the (*,G) forwarding state can include a "monitored" bit that is set whenever an upstream join is detected for multicast group G. An upstream join is detected either when the node receives an upstream join or when the node monitors the upstream join on a shared network segment (e.g., such as a multi-access LAN).

The monitored bit is used to determine whether to remove the RPF interface from the OIF list when a downstream prune is received. In response to receiving a downstream prune message specifying multicast group G, a node can remove the RPF interface from the OIF list from the (*,G) forwarding state unless the node has monitored (e.g., received or detected on a shared network segment) an upstream join sent by a PIM neighbor. If the node has monitored an upstream join sent by a PIM neighbor, the node should only remove the RPF interface from the OIF list if the upstream join is not refreshed within a timeout period.

In situations where the RP is simply a point on a network segment and not an actual device, the PIM-neighbor-check function can be disabled on each node on that same network segment, so that each of the nodes is able to forward upstream join messages to the RP. Disabling PIM-neighbor-check allows the nodes to monitor the network segment for join or prune messages being sent to the RP so that the nodes can correctly establish a (*,G) forwarding state that includes the RPF interface in the OIF list.

If a node receives a downstream join for a particular multicast group, and if the receiving node does not know the RPF interface for that particular multicast group, the receiving node can drop the downstream join (e.g., by discarding the downstream join message without further processing and without propagating the downstream join to other nodes). A receiving node should also drop any downstream joins that have a source count greater than one. The receiving node can also generate an error message (e.g., in an error log) in response to dropping a downstream join.

In the example of FIG. 2, there are currently not any receivers to multicast G. Accordingly, no join messages (upstream or downstream) specifying multicast group G have been propagated in network 2. Thus, none of nodes 14 have instantiated (*,G) forwarding state for multicast group G. As explained above, nodes that do not have any (*,G) forwarding state will not propagate multicast packets addressed to multicast group G towards the RP. Accordingly, the multicast packets generated by multicast source 10(1) are dropped (as indicated by the "X" in FIG. 2) by node 14(7). By dropping these packets (as opposed to forwarding the packets via the RPF interface towards node 14(3)) at node 14(7), bandwidth loss that would otherwise occur due to unnecessarily propagating the multicast packets is prevented.

In the example of FIG. 3, receiver 12(1) has subscribed to multicast group G. Accordingly, nodes 14 have each received a join message (either an upstream or a downstream join, as appropriate) and, in response, instantiated (*,G) forwarding state for multicast group G. Node 14(8) initiates the propagation of join messages in response to receiving an IGMP host report from receiver 12(1). Node 14(8) sends an upstream join to the designated forwarder for LAN 5, which is node 14(3) in this example. Node 14(3) instantiates (*,G) state for multicast group G (which does not identify the RPF interface in the OIF list) and forwards the upstream join towards the RP by sending the upstream join to node 14(2). In response to receiving the upstream join, node 14(2) similarly instantiates (*,G) state (again excluding the RPF interface from the OIF list) and sends the upstream join to RP 16. In response to receiving the upstream join, RP 16 sends a downstream join to node 14(1), causing node 14(1) to instantiate (*,G) forwarding state for multicast group G. Since node 14(1) received a downstream join, node 14(1) includes the RPF interface in the OIF list of the (*,G) forwarding state.

Node 14(2) also sends a downstream join to node 14(4) in response to receiving the upstream join from node 14(3). Node 14(4) propagates the downstream join to node 14(5), which in turn sends the downstream join to node 14(6). Receipt of the downstream join causes each of nodes 14(4), 14(5), and 14(6) to instantiate (*,G) forwarding state for multicast group G, with the RPF interface identified in the OIF list.

A join message can be provided to nodes on a multi-access LAN such as LAN 5 in a variety of different ways. In one embodiment, node 14(7) monitors LAN 5 and, in response to detecting the upstream join on LAN 5, behaves as if node 14(7) had received a downstream join from node 14(3) by instantiating (*,G) forwarding state and adding the RPF interface to the OIF list included in the (*,G) forwarding state. In an alternative embodiment, node 14(3) can explicitly send a downstream join to node 14(7) in response to receiving the upstream join from node 14(8).

As shown by the arrows in FIG. 3, multicast packets generated by source 10(1) will be forwarded to node 14(7), which in turn forwards the packets via its RPF interface to node 14(3), which is the designated forwarder. Node 14(8) receives the multicast packets via LAN 5 and forwards the multicast packets to receiver 12(1). Node 14(3) only identifies its downstream interface (leading to nodes 14(7) and 14(8)) in its OIF list for multicast group G). Accordingly, as indicated by the "X", node 14(3) does not forward the multicast packets towards the RP. This prevents bandwidth from being wasted due to unnecessarily forwarding the multicast packets to sections of the network that lack receivers.

FIG. 4 shows a situation in which both receiver 12(1) and receiver 12(3) have subscribed to multicast group G. The joins generated in response to receiver 12(1) subscribing to the group are propagated as described above in the example of FIG. 3. In response to receiving an IGMP host report from receiver 12(3) indicating that receiver 12(3) is subscribing to multicast group G, node 14(6) adds the receiving interface to its OIF list for multicast group G and sends an upstream join towards the RP.

Node 14(5) receives the upstream join, adds the receiving interface to its OIF list, and sends the upstream join to node 14(4). Node 14(4) similarly adds the receiving interface to its OIF list and sends the upstream join to node 14(1).

Node 14(2) receives the upstream join from node 14(4) and adds the interface leading to node 14(4) to its OIF list. Since node 14(1) now identifies multiple interfaces in its OIF list, node 14(1) sends a downstream join from all downstream (non-RPF) interfaces. Thus, node 14(1) sends the downstream join to node 14(3) as well as to nodes 14(4), 14(5), and 14(6). Node 14(1) also sends the upstream join to RP 16. This upstream join is handled as described in the example of FIG. 3.

In response to receiving the downstream join from node 14(1), node 14(3) adds the RPF interface to its OIF list. This example differs from the example shown in FIG. 3 because node 14(1) includes two interfaces in its OIF list for group G (in FIG. 3, node 14(3) only has one). Node 14(3) also sends a downstream join to nodes 14(7) and 14(8) via LAN 5. This downstream join in turn causes nodes 14(7) and 14(8) to add the RPF interface to their OIF lists. Similarly, nodes 14(4), 14(5), and 14(6) will add the RPF interface to their OIF lists in response to the downstream join that is propagated downstream from node 14(1).

As a result of the above-described sequence of join messages, the multicast packets generated by source 10(1) are now forwarded to both receiver 12(1) and receiver 12(3), as indicated by the arrows in FIG. 4. Since node 14(1) does not identify the RPF interface in its OIF list, node 14(1) will not forward the multicast packets to RP 16. This prevents bandwidth from being wasted by unnecessarily forwarding the multicast packets to RP 16.

Figure 5:
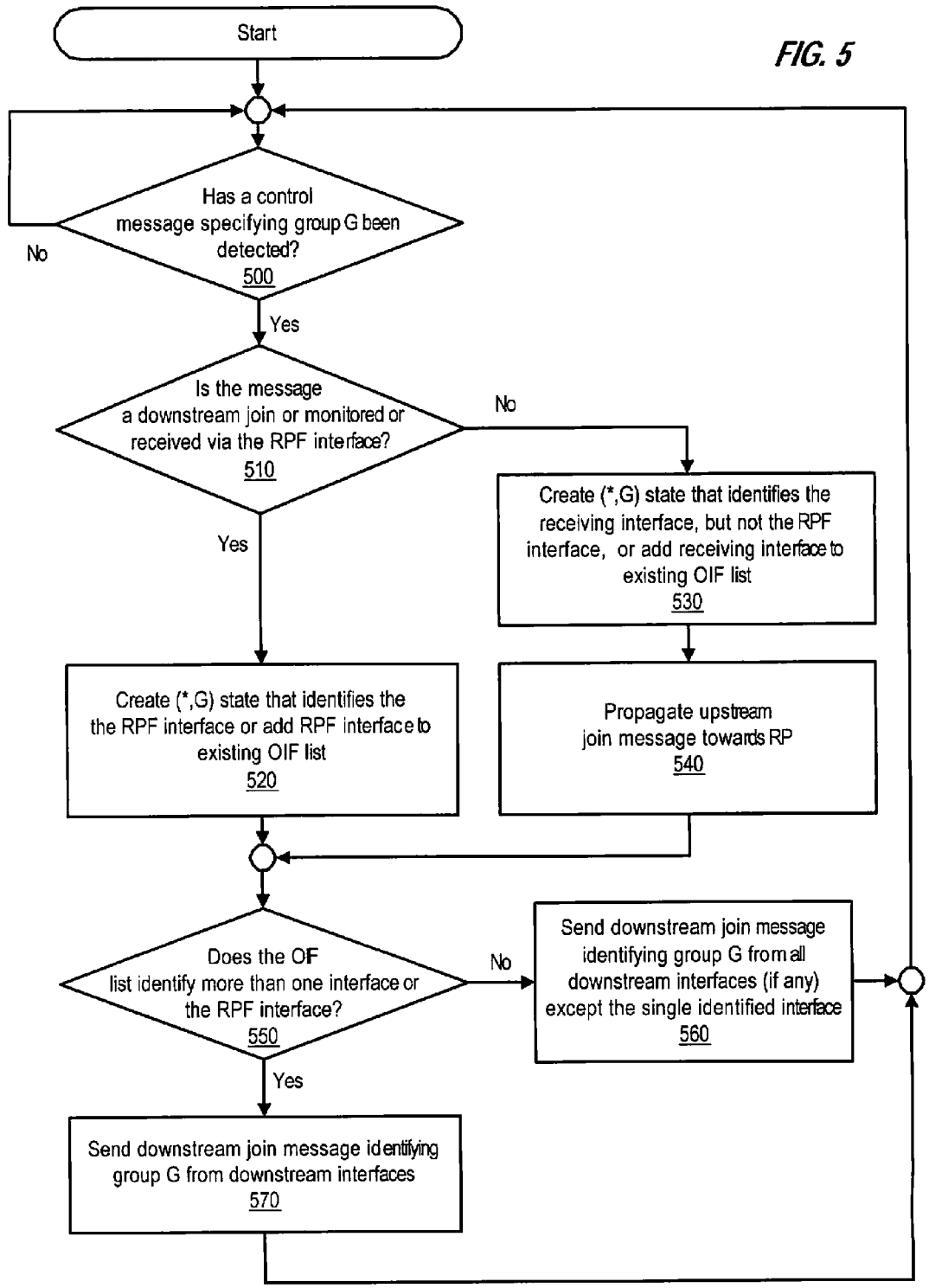
FIG. 5 is a flowchart illustrating how a network node uses two types of join messages while implementing PIM-Bidir multicast routing, according to one embodiment of the present invention.

FIG. 5 is a flowchart of a method illustrating how a network node uses two types of join messages while implementing PIM-Bidir multicast routing. This method can be performed by one of nodes 14(1)-14(8) of FIGS. 2, 3, and 4.

The method begins at 500. If a control message (e.g., an IGMP host report or a join message) specifying multicast group G has been detected (e.g., received or monitored), as determined at 500, the node determines whether the control message is a downstream join as well as whether the control message was received or monitored via the RPF interface, as shown at 510. The control message can be monitored if the RPF interface is coupled to a shared network segment (e.g., a LAN). The message is received is it is specifically being sent to the node (e.g., as indicated by the upstream neighbor field of the message identifying the node); the message is monitored if it detected on a shared network segment while being sent to another node (e.g., the designated forwarder for the shared network segment).

If the control message was received or monitored via the RPF interface or if the control message is a downstream join (e.g., as identified by parsing the upstream neighbor address field of the control message), the node instantiates (*,G) multicast forwarding state that identifies the RPF interface, as shown at 520. If (*,G) state already exists, the node adds the RPF interface to the existing OIF list (also indicated at 520).

If the control message is not a downstream join and was also not received or monitored via the RPF interface, the node instantiates (*,G) multicast forwarding state that identifies the receiving interface, but not the RPF interface, as shown at 530. If (*,G) state already exists, the node adds the receiving interface to the existing OIF list (also shown at 530). The node then propagates the upstream join towards the rendezvous point, as shown at 540.

If, as a result of creating or modifying the (*,G) state at either 520 or 530, the OIF list identifies (1) more than one interface or (2) the RPF interface, as determined at 550, the node also sends a downstream join message from one or more downstream interfaces. If there is more than one interface in the OIF list, the downstream join message will be sent from all downstream interfaces for which the node is a designated forwarder, as shown at 570. If the OIF list has been modified to include the RPF interface, the downstream join message will be sent from all interfaces other than the interface that received the join message that caused the OIF list to be modified. If the OIF list does not identify more than one interface and also does not identify the RPF interface, the node sends a downstream join message from all downstream interfaces (if any) other than the single interface identified in the OIF list, as shown at 560.

Figure 6:
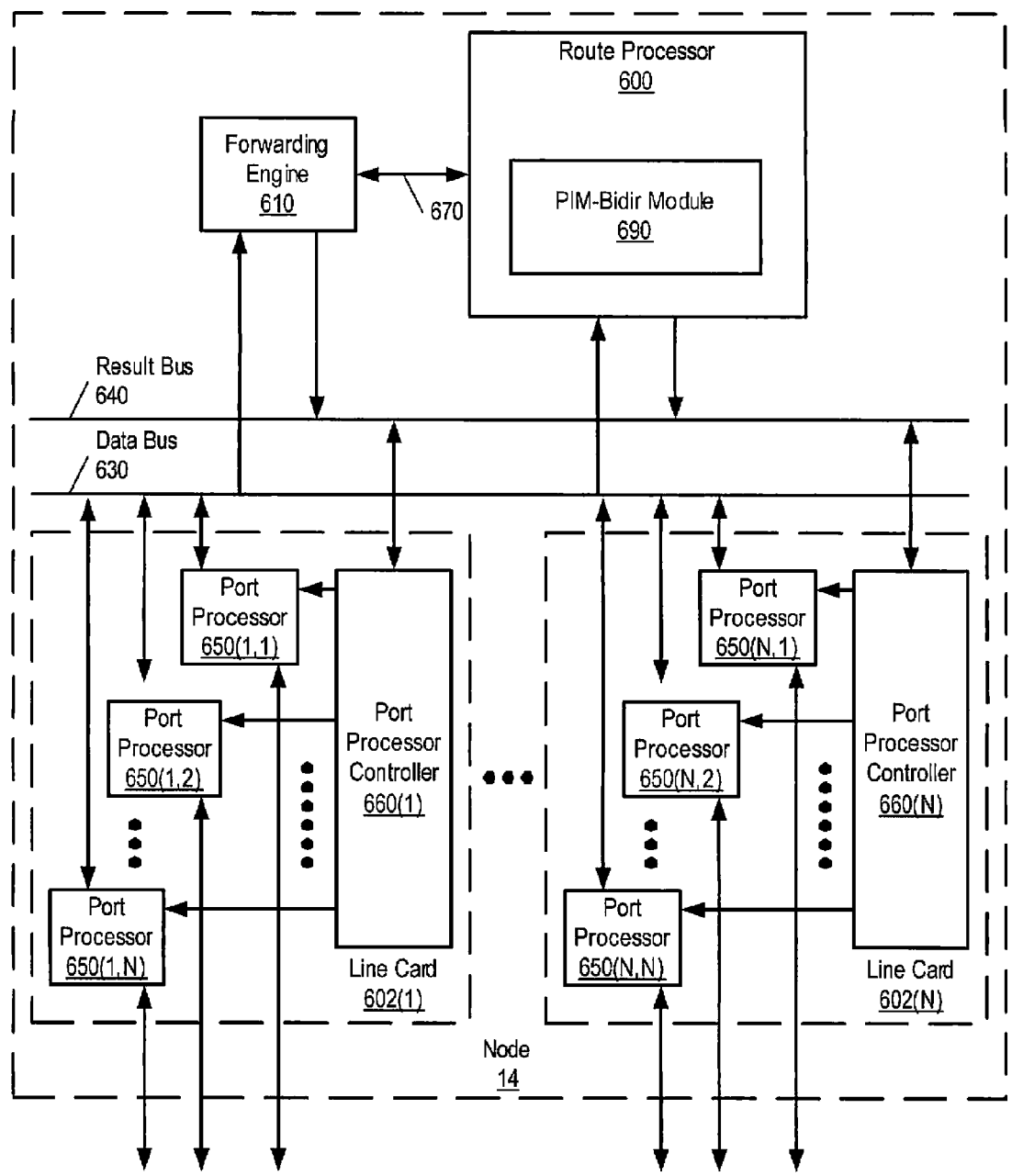
FIG. 6 is a block diagram of a network device, according to one embodiment of the present invention.

FIG. 6 is a block diagram of a node 14 (e.g., one of nodes 14(1)-14(8) of FIGS. 2, 3, and 4). In this depiction, node 14 includes a number of line cards (line cards 602(1)-602(N)) that are communicatively coupled to a forwarding engine 610 and a route processor 600 via a data bus 630 and a result bus 640. Routing processor 600 includes PIM-Bidir module 690, which implements the PIM-Bidir multicast protocol using two types of join messages, as described above. For example, PIM-Bidir module 690 can implement at least some of the functionality of the flowchart of FIG. 5.

Line cards 602(1)-602(N) include a number of port processors 650(1,1)-650(N,N) which are controlled by port processor controllers 660(1)-660(N). It will also be noted that forwarding engine 610 and route processor 600 are not only coupled to one another via data bus 630 and result bus 640, but are also communicatively coupled to one another by a communications link 670. It is noted that in alternative embodiments, each line card can include a forwarding engine.

When a message is received, the message is identified and analyzed by a network device such as node 14 in the following manner, according to embodiments of the present invention. Upon receipt, a message (or some or all of its control information) is sent from the one of port processors 650(1,1)-650(N,N) at which the message was received to one or more of those devices coupled to data bus 630 (e.g., others of port processors 650(1,1)-650(N,N), forwarding engine 610 and/or route processor 600). Handling of the message can be determined, for example, by forwarding engine 610. For example, forwarding engine 610 may determine that the message should be forwarded to one or more of port processors 650(1,1)-650(N,N). This can be accomplished by indicating to corresponding one(s) of port processor controllers 660(1)-660(N) that the copy of the message held in the given one(s) of port processors 650(1,1)-650(N,N) should be forwarded to the appropriate one of port processors 650(1,1)-650(N,N).

Figure 7:
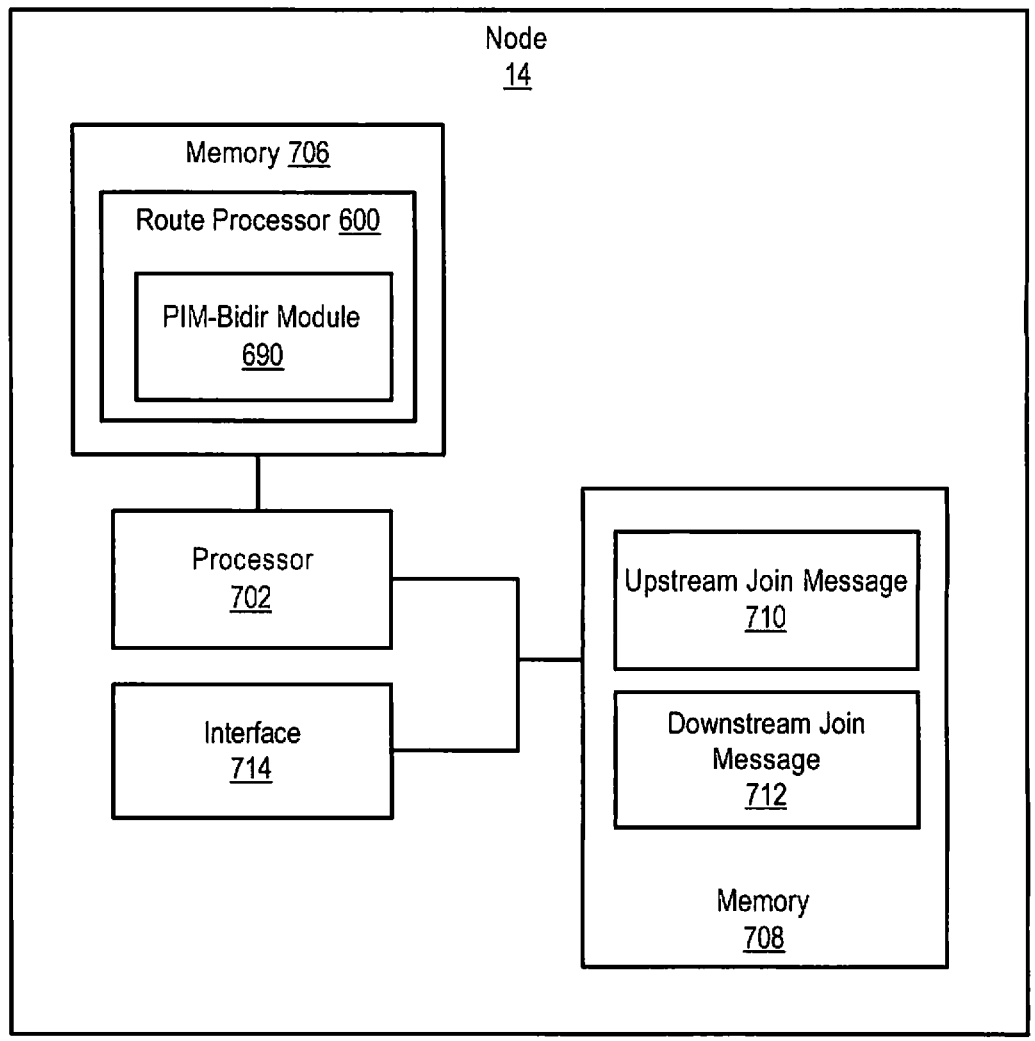
FIG. 7 is another block diagram of a network device, according to one embodiment of the present invention.

FIG. 7 illustrates a block diagram of a node 14 (e.g., one of core nodes 14(1)-14(8) of FIGS. 2, 3, and 4), which illustrates how PIM-Bidir module 690 (as shown in FIG. 6) can be implemented in software. As illustrated, node 14 includes one or more processors 702 (e.g., microprocessors, PLDs (Programmable Logic Devices), or ASICs (Application Specific Integrated Circuits)) configured to execute program instructions stored in memory 706. Memory 706 can include various types of RAM (Random Access Memory), ROM (Read Only Memory), Flash memory, MEMs (Micro Electro-Mechanical Systems) memory, and the like. Processor 702 and memory 706 can be included in a route processor (e.g., route processor 600 of FIG. 6). Processor 702 and memory 706 are coupled to send and receive data and control signals by a bus or other interconnect.

Network node 12(1) also includes an interface 714 (e.g., one of port processors 650(1,1)-650(N,N) of FIG. 6). In response to receiving a packet (e.g., such as upstream join message 710 or downstream join message 712), interface 714 can store copies of the received packets in memory 708. Processor 702, interface 714, and memory 708 are coupled to send and receive data and control signals by a bus or other interconnect.

In this example, program instructions executable to implement PIM-Bidir module 690 are stored in memory 706. Additionally, multicast forwarding state information can be stored in memory 706 for use by PIM-Bidir module 690. The program instructions and data implementing PIM-Bidir module 690 can be stored on various computer readable media such as memory 706. In some embodiments, PIM-Bidir module 690 software is stored on a computer readable medium such as a CD (Compact Disc), DVD (Digital Versatile Disc), hard disk, optical disk, tape device, floppy disk, and the like). In order to be executed by processor 702, the instructions and data implementing PIM-Bidir module 690 are loaded into memory 706 from the other computer readable medium. The instructions and/or data implementing PIM-Bidir module 690 can also be transferred to node 14 for storage in memory 706 via a network such as the Internet or upon a carrier medium. In some embodiments, a computer readable medium is a carrier medium such as a network and/or a wireless link upon which signals such as electrical, electromagnetic, or digital signals, on which the data and instructions implementing PIM-Bidir module 690 are encoded, are conveyed.

For purposes of this disclosure, a "packet" may include a cell, datagram, frame, message, segment, or any other logical group of information that is conveyed via a network. Network devices perform switching and routing functions in order to convey messages from a source to a destination along a path.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:
1. A method comprising:
receiving a multicast packet addressed to multicast group G via a first interface, wherein
multicast routing for the multicast group G is performed using a modified version of a bidirectional multicast routing protocol, and
in an unmodified version of the bidirectional multicast routing protocol, all multicast packets for the multicast group G are automatically forwarded via an interface leading towards a rendezvous point for the multicast group G;
determining whether a join message has been received from a first receiver via a Reverse Path Forwarding (RPF) interface, wherein
the determining is performing using (*, G) state information for the multicast group G,
the (*,G) state information for the multicast group G comprises an outgoing interface list, and
the RPF interface is an interface used to send packets towards the rendezvous point for the multicast group G; and
inhibiting the multicast packet from being automatically forwarded via the RPF interface, unless the determining indicates that the join message has been received from the first receiver via the RPF interface, wherein
the first interface is not the interface leading towards the rendezvous point.
2. The method of claim 1, further comprising:
generating the (*, G) state information for the multicast group G, in response to receiving an indication that a receiver is joining the multicast group G, wherein
the indication is received via an interface that does not lead to the rendezvous point, and
the outgoing interface list in the (*, G) state information does not identify the interface leading towards the rendezvous point.
3. The method of claim 2, further comprising:
receiving a downstream join message identifying the multicast group G; and
adding, to the outgoing interface list, information identifying the interface leading towards the rendezvous point, in response to the receiving the downstream join message.
4. The method of claim 2, further comprising:
detecting an upstream join message specifying the multicast group G, wherein the upstream join message is detected by monitoring a shared network segment; and adding, to the outgoing interface list, information identifying the interface leading towards the rendezvous point, in response to the detecting the upstream join message.

5. The method of claim 2, further comprising:
sending a downstream join message identifying the multicast group G to one or more downstream network devices.

6. The method of claim 5, wherein
the sending the downstream join message is performed in response to at least one of:
more than one outgoing interface being identified in the outgoing interface list,
the interface leading to the rendezvous point being identified in the outgoing interface list, and
only one of a plurality of downstream interfaces being identified in the outgoing interface list, wherein if the outgoing interface list lists only one of the downstream interfaces, the sending the downstream join message comprises sending the downstream join message from each downstream interface other than the one of the downstream interfaces identified in the outgoing interface list.

7. The method of claim 6, wherein
the sending the downstream join message comprises sending the downstream join message from each one of a plurality of interfaces.

8. A node comprising:
an interface, wherein
the interface is configured to receive a multicast packet addressed to multicast group G,
multicast routing for the multicast group G is performed using a modified version of a bidirectional multicast routing protocol, and
in an unmodified version of the bidirectional multicast routing protocol, all multicast packets for the multicast group G are automatically forwarded via an interface leading towards a rendezvous point for the multicast group G;
a Reverse Path Forwarding (RPF) interface coupled to send packets towards the rendezvous point for the multicast group G; and
a bidirectional multicast routing module coupled to the interface and the RPF interface, wherein
the bidirectional multicast routing module is configured to determine whether a join message has been received from a first receiver via the RPF interface, wherein
the determine is performed using (*, G) state information for the multicast group G, and
the (*,G) state information for the multicast group G comprises an outgoing interface list, and
the bidirectional multicast routing module is further configured to inhibit the multicast packet from being automatically forwarded via the RPF interface, unless a determination is made that the join message has been received from the first receiver via the RPF interface.

9. The node of claim 8, wherein the bidirectional multicast routing module is further configured to:
generate the (*, G) state information for the multicast group G, in response to reception of an indication that a receiver is joining the multicast group G, wherein the outgoing interface list in the (*, G) state information does not identify the RPF interface.

10. The node of claim 9, wherein the bidirectional multicast routing module is further configured to:
add, to the outgoing interface list, information identifying the RPF interface, in response to reception of a downstream join message identifying the multicast group G.

11. The node of claim 9, wherein
the RPF interface is configured to detect an upstream join message specifying the multicast group G,
the upstream join message is detected by monitoring a shared network segment, and
the bidirectional multicast routing module is configured to add, to the outgoing interface list, information identifying the RPF interface, in response to detection of the upstream join message.

12. The node of claim 9, wherein
the bidirectional multicast routing module is configured to send a downstream join message identifying the multicast group G to one or more downstream network devices.

13. The node of claim 12, wherein
the downstream join message is sent in response to at least one of:
more than one outgoing interface being identified in the outgoing interface list,
the RPF interface being identified in the outgoing interface list, and
only one of a plurality of downstream interfaces being identified in the outgoing interface list, wherein if the outgoing interface list lists only one of the downstream interfaces, the downstream join message is sent from each downstream interface other than the one of the downstream interfaces identified in the outgoing interface list.

14. A system comprising:
means for receiving a multicast packet addressed to multicast group G via a first interface, wherein
multicast routing for the multicast group G is performed using a modified version of a bidirectional multicast routing protocol, and
in an unmodified version of the bidirectional multicast routing protocol, all multicast packets for the multicast group G are automatically forwarded via an interface leading towards a rendezvous point for the multicast group G;
means for determining whether a join message has been received from a first receiver via a Reverse Path Forwarding (RPF) interface, wherein
the determining is performing using (*, G) state information for the multicast group G,
the (*,G) state information for the multicast group G comprises an outgoing interface list, and
the RPF interface is an interface used to send packets towards the rendezvous point for the multicast group G; and
means for inhibiting the multicast packet from being automatically forwarded via the RPF interface, unless the determining indicates that the join message has been received from the first receiver via the RPF interface, wherein
the first interface is not the interface leading towards the rendezvous point.

15. The system of claim 14, further comprising:
means for generating the (*, G) state information for the multicast group G, in response to receiving an indication that a receiver is joining the multicast group G, wherein the indication is received via an interface that does not lead to the rendezvous point, and the outgoing interface list in the (*, G) state information does not identify the interface leading towards the rendezvous point.

16. The system of claim 15, further comprising:
means for receiving a downstream join message identifying the multicast group G; and
means for adding, to the outgoing interface list, information identifying the interface leading towards the rendezvous point, in response to receiving the downstream join message.

17. The system of claim 15, further comprising:
means for detecting an upstream join message specifying the multicast group G, wherein
the upstream join message is detected by monitoring a shared network segment; and
means for adding, to the outgoing interface list, information identifying the interface leading towards the rendezvous point, in response to detecting the upstream join message.

18. The system of claim 15, further comprising:
means for sending a downstream join message identifying the multicast group G to one or more downstream network devices.

19. The system of claim 18, wherein
the downstream join message is sent in response to at least one of:
more than one outgoing interface being identified in the outgoing interface list,
the RPF interface being identified in the outgoing interface list, and
only one of a plurality of downstream interfaces being identified in the outgoing interface list, wherein if the outgoing interface list lists only one of the downstream interfaces, the downstream join message is sent from each downstream interface other than the one of the downstream interfaces identified in the outgoing interface list.

* * * * *